(No Model.) 2 Sheets—Sheet 1.
I. B. KLEINERT & A. C. SQUIRES.
METHOD OF AND APPARATUS FOR FORMING ARTICLES OF FLEXIBLE MATERIAL.
No. 352,330. Patented Nov. 9, 1886.
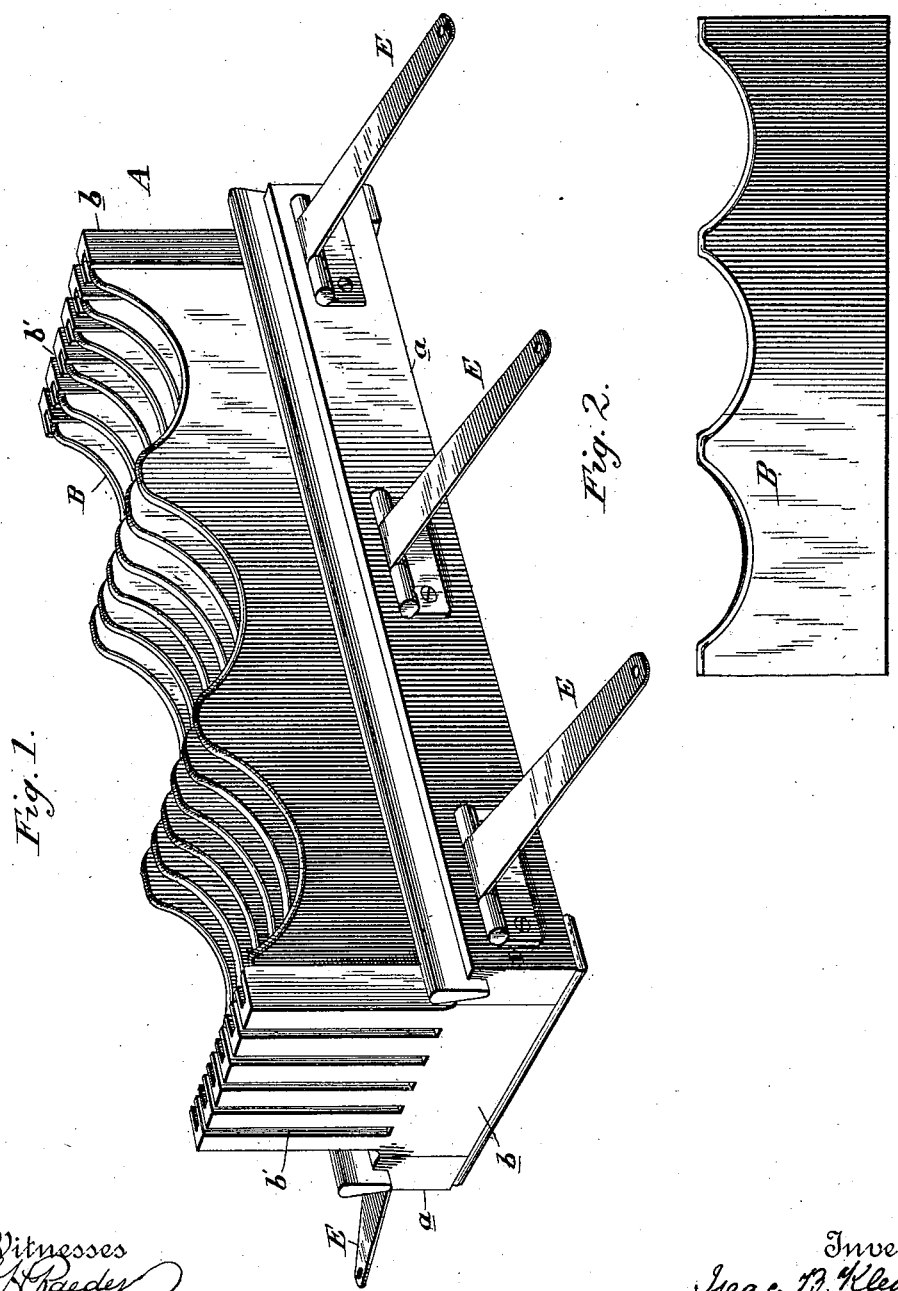

(No Model.) 2 Sheets—Sheet 2.

I. B. KLEINERT & A. C. SQUIRES.
METHOD OF AND APPARATUS FOR FORMING ARTICLES OF FLEXIBLE MATERIAL.

No. 352,330. Patented Nov. 9, 1886.

Witnesses
Inventors
Isaac B Kleinert
Arthur C Squires
By their Attorney
T. J. W. Robertson

UNITED STATES PATENT OFFICE.

ISAAC B. KLEINERT, OF NEW YORK, AND ARTHUR C. SQUIRES, OF BROOKLYN, NEW YORK; SAID SQUIRES ASSIGNOR TO SAID KLEINERT.

METHOD OF AND APPARATUS FOR FORMING ARTICLES OF FLEXIBLE MATERIAL.

SPECIFICATION forming part of Letters Patent No. 352,330, dated November 9, 1886.

Application filed June 10, 1886. Serial No. 204,795. (No model.)

*To all whom it may concern:*

Be it known that we, ISAAC B. KLEINERT and ARTHUR C. SQUIRES, citizens of the United States of America, the former residing at New York, in the county and State of New York, and the latter residing in Brooklyn, in the county of Kings and State of New York, aforesaid, have invented certain new and useful Improvements in the Method of and Apparatus for Forming Articles of Flexible Materials, of which the following is a specification, reference being had therein to the accompanying drawings, in which—

Figure 3:
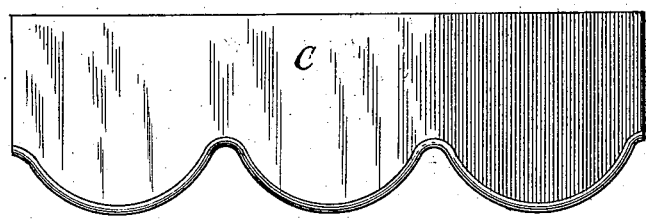
Figure 4:
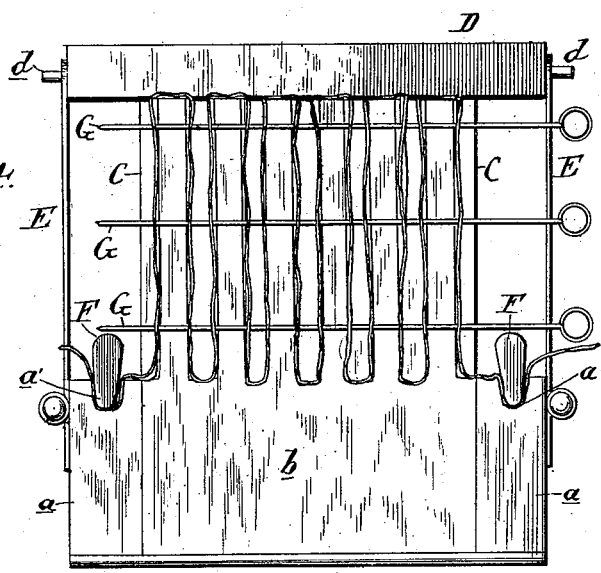
Figure 5:
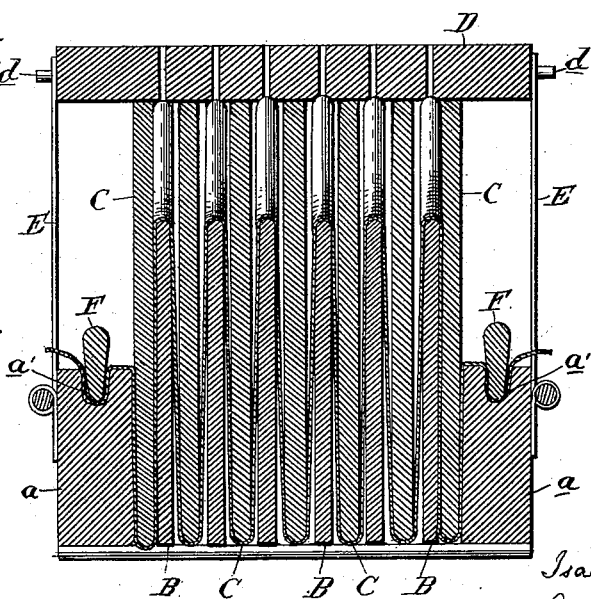

Figure 1 represents a perspective view of the main portion of an apparatus which we employ in carrying out our method; Fig. 2, a side view of one of the partitions of said apparatus detached; Fig. 3, a similar view of a shaper to be inserted between the partitions of the part shown in Fig. 1; Fig. 4, an end view of our machine with the material, shapers, covers, &c., in place; and Fig. 5, a transverse vertical section through the line X X in Fig. 1.

Our invention relates to a method of and a machine for forming or shaping articles made of flexible material, and is more especially adapted to the manufacture of armpit-shields; and the invention consists in the method of operation and the apparatus by which we carry out our method, as hereinafter described, and then more particularly pointed out in the claims.

The objects of our invention are, first, to facilitate production; second, to economize material; third, to economize time in making the article; fourth, to prevent soiling the material by handling; fifth, to produce a more uniform stretching; sixth, to economize space in vulcanization where a vulcanizable material is used.

The appended drawings show what we consider the preferable form of apparatus by which our method is carried out; but we do not wish to be limited to the exact form shown therein, as it may be varied in many ways.

Referring now to the details of said drawings, A represents the main frame, consisting, essentially, of two side bars, *a a*, and two end pieces, *b b*, each of which end pieces is provided with a series of grooves to receive the partitions or formers B, and a series of slots, *b' b'*, as shown plainly in Figs. 1 and 4. The partitions B are formed at their upper edge of the exact form the articles to be produced are to have at their upper edge, and are inserted, as shown, in the grooves in the end pieces, *b*. At C is shown the shapers or stretchers, whose exact form is shown in Fig. 3, and their lower edges are formed to correspond precisely to the lower edge of the article to be shaped.

At D is shown a preferably perforated board provided with pins or buttons *d*, which pass or catch into holes formed in the fasteners or latches E, which are hinged to the lower part or side bars, *a a*, of the frame. The side bars are provided with grooves *a'*, in which fit the holding-bars F, which are of such thickness that when a piece of the cloth to be operated on is placed over one of the grooves and a bar, F, forced therein the cloth will be firmly held by the same. The frame is preferably made very nearly as long as the width of the goods which is to be used, and the number of the cells may be as many as convenient to handle in one frame.

The method of using the apparatus in making dress-shields and similar articles is as follows: We fasten one end of the material in one of the grooves *a'* by means of one of the bars F, and then place the material in the cells formed by the partitions. This we prefer to do by pressing it in with a series of rather heavy but thin flat metal bars, which are forced between the partitions one after the other until there is just sufficient material in each cell to form the article to be produced. This is done uniformly by means of the slots in the end boards, *b*, the bottoms of which form guides, which limit the depth to which the bars, and consequently the material, is pressed in by them. When all the cells are so filled, the material is fastened in with the other bar F, or in any other convenient way. We then pull the goods projecting on each side of the frame sufficiently to take out all wrinkles from the surface between the cells, and fasten the same preferably with thin stiff wires G, stuck through the projecting ends of the material. We then insert the shapers C into each of the cells, and then place the board D on them, and subject the whole to a gradual pressure until the shapers C descend the extent to which the stretching is to be carried, when the fasteners E are raised and buttoned onto the buttons or pins d, and thus the shapers C are held securely in the desired position. Any other device may be used instead of the board, as long as the same object is obtained or the same functions performed—namely, the pressing down and holding in the desired position of the shapers C. We then subject the whole machine and its contents to the action of any known method to secure the "set" of the shaped articles or material, according to the kind of goods under treatment.

In the case of a seamless dress-shield containing vulcanizible rubber the whole apparatus and its contents may be put into the vulcanizer and treated in the usual manner of vulcanizing such articles, after which the material is removed from the frames and the edges cut by a die, which cuts or trims a large number at a single blow.

The advantages of this our new method and machine over all others known to us is strikingly apparent and of very great importance in cheapening the article and greatly facilitating its production. Heretofore the goods used for forming such articles of manufacture necessitated a great waste of material, as every piece had to be cut much larger than the desired area of the article, to permit of the handling of it by the manipulator. In our improved method we waste practically no material, as only so much material is inserted into the cells as the area of the shields or other articles which may be under treatment requires, and the waste is limited to the small portion necessarily allowed for the trimming of the edges. We thus save a very large quantity of goods or material, thereby reducing the cost of the production. In the making of the article we obtain a still further saving, as our apparatus will turn out several dozen pairs of dress-shields by the one operation described. In fact, the amount so produced is limited only by the number of cells in each frame. The ordinary width of goods will produce from four to six shields to each cell, according to the size of the shield and width of the goods.

The saving in labor, as compared with the handling of each single shield individually, as usually done, is almost beyond calculation.

After the article is taken from the frames, when it has been set or vulcanized, another saving of time is effected by trimming the edges of as many shields at one time as there are cells in the apparatus. This can be done by a die with a single stroke.

The stretching of the shields being done uniformly, and without any extra strain upon any particular point, amounts in reality only to a displacement of the relative angles of the threads or meshes, and no injury is done to the rubber, when rubber goods are used, which is not always the case when the stretching is done singly by hand, or by tightly fitting male and female dies, which are sometimes employed.

By this process no tightly-fitting dies are needed to take out cockles or wrinkles on the surface of the shield, for such things do not occur, because the stretch is even and simultaneous at every part, and all liability of cutting the material by closely-fitting dies is thus avoided.

What we claim as new is—

1. The herein-described method of forming articles of flexible material, which consists in passing a fold of the material into one of a series of cells and temporarily holding the same while another cell is filled, then inserting another fold of the material into another of the cells, and repeating said operation until the necessary folds have been inserted in the cells, and finally pressing simultaneously a series of stretchers into the cells, substantially as described.

2. The herein-described method of forming articles of flexible material, which consists in passing a fold of the material into one of a series of cells and temporarily holding the same while another cell is filled, then inserting another fold of the material into another of the cells, and repeating said operation until the necessary folds have been inserted in the cells, next pressing simultaneously a series of stretchers into the cells, then submitting the material to a setting operation, and finally cutting the different articles apart and trimming their edges simultaneously by a cut at right angles to the folds, substantially as set forth.

3. The combination, in a machine for forming articles of flexible material, of a frame provided with a series of partitions forming cells between them adapted to receive folds of the material being operated on, means, as the pins G, for securing the edges of the material, a series of stretchers constructed to pass between the folds, and means, as the board D and fasteners E, for holding the stretchers in position, substantially as described.

4. The herein-described method of forming articles of flexible material, which consists in forcing the same between a series of partitions or formers, the outlines of whose upper edges are substantially the shape of the fold of the articles to be formed, then subjecting the same to vulcanization, and finally cutting said articles apart and trimming the same to shape simultaneously, substantially as described.

5. The combination, in a machine for forming articles of flexible material, of a frame provided with a series of stationary partitions or formers whose upper edges are substantially the shape of the fold of the article to be formed, a series of movable shapers whose lower edges are substantially the shape of another fold or edge of the article to be formed, and means, as the board D and fasteners E, for holding the said shapers in position, substantially as described.

6. The combination, in a machine for forming articles of flexible material, of a frame provided with the side bars, a, the slotted end bars, b, the partitions B, shapers C, top board, D, and fasteners d E, substantially as described.

In testimony whereof we affix our signatures, in presence of two witnesses, this 8th day of June, 1886.

ISAAC B. KLEINERT.
ARTHUR C. SQUIRES.

Witnesses:
Jos. S. MICHAEL,
JOSEPH B. LYMAN.